United States Patent Office 2,800,417
Patented July 23, 1957

2,800,417

PRINTING PASTE AND METHOD OF PRINTING TEXTILES THEREWITH

Helmut Kleiner, Opladen, and Wolfgang Lehmann, Leverkusen-Bayerwerk, Germany, assignors to Farbenfabriken Bayer Aktiengesellschaft, Leverkusen, Germany, a corporation of Germany No Drawing. Application July 22, 1952,
Serial No. 300,340

13 Claims. (Cl. 117—38)

The present invention relates to a new process of decorating substrata, especially textile fabrics.

It has heretofore been proposed to insolubilize soluble or fusible compounds containing two or more primary or secondary amino groups in the molecule by the action of polyfunctional compounds which are capable of reacting with amino groups.

In accordance with the invention it has been found that insoluble coatings, for instance for fixation of pigments in textile printing, for producing films, for impregnating and sizing, are obtained by using soluble or fusible substances, such as polymers, condensation or addition products, containing in their molecule, on the one hand, basic nitrogen groups capable of forming salts and, on the other hand, groups which are capable of reacting with the basic nitrogen groups with cross-linking.

The basic nitrogen groups may be primary, secondary or tertiary amino groups or quarternary ammonium groups. They may be introduced into the polymers in various ways, for instance by polymerizing therewith compounds capable of subsequent reaction with di- or polyamines in such a manner that basic groups remain in the final product or by starting from materials resulting in products which still contain basic nitrogen groups after reaction.

As soluble or fusible compounds polymers or co-polymers may be employed containing recurring groups of the general formula

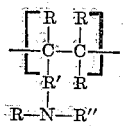

wherein R stands for H or CH₃, C₂H₅, C₃H₇, C₄H₉, C₅H₁₁ etc., R' stands for —OCH₂CH₂—, —CH₂—, —CO— or nothing and R" stands for a lower alkyl radical that is substituted by amino groups or an alkyl radical wherein one or more of the CH₂ groups of the chain are replaced by imino groups, so that at least 2CH₂-groups stand between each imino group.

Such polymers are obtainable for instance by reduction or hydrogenation of nitro- or nitrilo groups containing polymers by the action of nascent or catalytically activated hydrogen.

Basic ethers may be obtained by the addition of ethylene imine to hydroxyl containing polymers.

Polyvinylamines may be obtained by saponification of polymeric vinyl succinimide or vinyl phthalimide by means of hydrozine hydrate, preferably according to the process of Reynolds (J. Am. Chem. Soc., 69/4, page 911).

Furthermore, all those high molecular weight compounds are suited for the process according to the invention in which halogen atoms may be exchanged for amino groups, for instance in chlorinated polyisobutylenes, chlorinated paraffin hydrocarbons containing about 12-20 carbon atoms.

As a further example of the many possibilities may be mentioned the interpolymerization of styrene and acrylfluoride and the subsequent reaction of the interpolymer with a diamine, for instance methyl-propylene-diamine, in the molecular proportion 1:1.

Furthermore as examples of basic compounds according to the invention may be named basic polysaccharides, the so-called aminocellulose, amino-starch, addition products of ethylene imine and cellulose, derivatives of protein substances, for instance aminolysates and hydrolysates of glue, casein and gelatine.

Especially suitable among these products are those containing as recurring groups

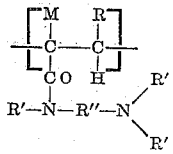

wherein R stands for H or CH₃, R' stands for H or a lower alkyl radical, such as CH₃, C₂H₅, C₃H₇ etc. and R" stands for an alkylene radical such as (CH₂)₂, (CH₂)₃, (CH₂)₆,

which may also contain imino groups in its chain, so that at least 2 CH₂-groups stand between each imino group, for instance

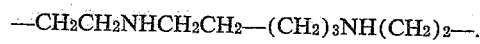

Moreover the polymer may be a co-polymer containing besides these recurring groups ester groups, carboxylic groups, halogen groups, hydroxy groups and phenyl groups.

These products are formed, for instance, by the reaction of polyacrylonitrile with boiling polyamines, such as ethylene diamine, and subsequent treatment of the reaction product with water.

Furthermore these products are obtained by aminolysis of polyacrylates, polymethacrylates or polyacrylamides with di- or polyamines, especially with diprimary polyamines, so that only one group each of di- or polyamines is reacted. As acrylates or methacrylates the methyl, ethyl, butyl or hexyl esters may be used.

The polymers to be used according to the invention are preferably applied in solution in order to inhibit a premature reaction of the amino groups with the other reactive substituents of the molecule. It is of advantage to protect the amino groups by salt formation. Especially useful for this purpose are acids which are easily volatile or can easily be separated at higher temperatures, for instance weak organic acids such as acetic acid and lactic acid. In general the intermolecular cross-linking is carried out at temperatures from about 100° to about 200° C. When strong acids are employed the amino groups can be set free by an alkaline treatment of the impregnated or decorated material, for instance a printed fabric. In the latter case cross-linking may be effected at somewhat lower temperatures, say about 80° to 150° C.

The process of the invention may serve for various purposes, for instance for fixing pigments in textile printing, for impregnating, for preparing films or coatings, sizing, making water-repellent of textiles etc.

The present invention is further illustrated by the following examples without being restricted thereto, the parts being by weight:

*Example 1*

500 parts of a polymer of butyl acrylate having the K-value 20 are refluxed with 350 parts of tetramethylene diamine in 500 parts of butanol until a sample liberated from the solvent has become soluble in dilute acetic acid, about 8–10 hours being required therefor. The solvent and excess amine are distilled off in vacuo under mild conditions and the residue is washed with water several times. The aqueous paste is neutralized with acetic acid and adjusted to a content of 40%. The content of basic nitrogen (referred to the solid substance) amounts to about 1.4%.

200 parts of the above aqueous 40% paste,
350 parts of tragacanth 65:1000,
300 parts of water and
150 parts of a 15% paste of copper phthalocyanine are stirred into a printing paste of good furnishing properties which after passing through a sieve is printed upon a cotton fabric by means of roller printing machines. The printed fabric is subsequently heated to 140° C. for 30 minutes. A full, blue printing design is thus obtained which is fast to washing, boiling soda and light.

*Example 2*

100 parts of polyacrylonitrile powder having the K-value 100 are refluxed in 1000 parts of ethylene diamine until a yellow solution has formed. The amine is distilled off under reduced pressure at about 50° C., the residue is washed with acetone and carefully dried in vacuo at 50° C. The reaction product is soluble in water, dilute acids and alcohol. On standing for a prolonged period it gradually becomes insoluble due to self-linking. It is therefore advisable to store the product in solution.

By impregnating a fabric with the above aqueous solution of basic polyacryamide and heating to 120° C. for some time a finish resistant to washing is obtained.

We claim:

1. A printing paste consisting of an aqueous solution of a salt of an acid and a polymer selected from the group consisting of polymers having as recurring groups

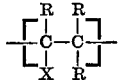

wherein X stands for a radical selected from the group consisting of

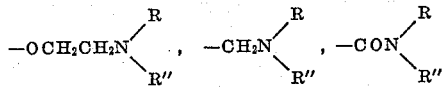

and

R stands for a radical selected from the group consisting of hydrogen and a lower alkyl radical and R" stands for a radical selected from the group consisting of an alkyl radical substituted by amino groups which contain at least one free hydrogen atom and an alkyl radical, some of the CH₂-groups of the chain of which are replaced by imino groups so that at least 2 CH₂-groups stand between each imino group, a thickening agent and a pigment.

2. A printing paste as claimed in claim 1 in which the acid is a weak and volatile acid.

3. A printing paste as claimed in claim 2 in which the polymer contains recurring groups of the formula

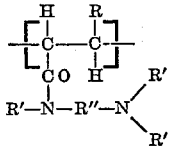

wherein R stands for a radical selected from the group consisting of H and CH₃, R' stands for a radical selected from the group consisting of hydrogen, a lower alkyl radical and a lower alkyl radical substituted by hydroxy groups at least one of the R' radicals of the

group being hydrogen, and R" stands for a radical selected from the group consisting of an alkylene radical and an alkylene radical some of the CH₂-groups of which are replaced by imino groups, so that at least 2 CH₂-groups stand between each imino group.

4. A printing paste as claimed in claim 2 in which the co-polymer contains recurring groups of the formula

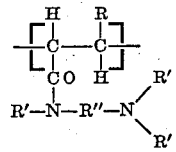

wherein R stands for a radical selected from the group consisting of H and CH₃, R' stands for a radical selected from the group consisting of hydrogen, a lower alkyl radical and a lower alkyl radical substituted by hydroxy groups at least one of the R' radicals of the

group being hydrogen, and R" stands for a radical selected from the group consisting of an alkylene radical and an alkylene radical some of the CH₂-groups of which being replaced by imino groups, so that at least 2 CH₂-groups stand between each imino group and recurring groups of the formula

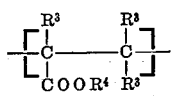

wherein R³ stands for a radical selected from the group consisting of H and CH₃ and R⁴ stands for a radical selected from the group consisting of hydrogen and a lower alkyl radical.

5. The process for decorating textiles which comprises applying to said textiles a printing paste as claimed in claim 1 to form a printed textile, treating said printed textile to free the amino groups in the polymers of said printing paste and effect development at temperatures of about 80° to about 200° C.

6. The process for decorating textiles which comprises applying to said textiles a printing paste as claimed in claim 2 to form a printed textile, treating said printed textile to free the amino groups in the polymers of said printing paste and effect development at temperatures of about 100° to about 200° C.

7. The process for decorating textiles which comprises applying to said textiles a printing paste as claimed in claim 3 to form a printed textile, treating said printed textile to free the amino groups in the polymers of said printing paste and effect development at temperatures of about 100° to about 200° C.

8. The process for decorating textiles which comprises applying to said textiles a printing paste as claimed in claim 4 to form a printed textile, treating said printed textile to free the amino groups in the polymers of said printing paste and effect development at temperatures of about 100° to about 200° C.

9. The process for decorating textiles which comprises applying to said textiles a printing paste as claimed in claim 1, then treating the textiles with an alkaline medium selected from the group consisting of an aqueous solution of an alkaline metal hydroxide, alkali metal carbonate and ammonia, and developing at temperatures of about 80° to about 150° C.

10. The process for printing textiles which comprises applying to said textiles a printing paste as defined in claim 1 to form a printed textile, treating said printed textile to free the amino groups in the polymers of said printing paste and effect development at temperatures of about 80° C. to 200° C.

11. The process as claimed in claim 10 wherein the acid is a weak and volatile acid.

12. The process as claimed in claim 11 wherein the basic polymer is a basic polymer of an ester of an unsaturated aliphatic acid.

13. The process for printing textiles which comprises applying to said textiles a printing paste as defined in claim 1, then treating the textiles with an alkaline medium selected from the group consisting of an aqueous solution of an alkali metal hydroxide, alkali metal carbonate and ammonia, and developing at temperatures of about 80° C. to about 150° C.

References Cited in the file of this patent
UNITED STATES PATENTS

| | | |
|---|---|---|
| 1,984,417 | Mark | Dec. 18, 1934 |
| 2,146,209 | Graves | Feb. 7, 1939 |
| 2,169,366 | Meigs | Aug. 15, 1939 |
| 2,239,718 | Izard | Apr. 29, 1941 |
| 2,343,808 | Schlack | Mar. 7, 1944 |
| 2,478,378 | Dickey | Aug. 9, 1949 |
| 2,592,248 | Coover | Apr. 8, 1952 |
| 2,595,907 | Thomas | May 6, 1952 |
| 2,643,958 | Kleiner | June 30, 1953 |